United States Patent [19]

Hamel

[11] 4,260,328
[45] Apr. 7, 1981

[54] WINDMILL

[76] Inventor: Roland R. Hamel, Whispering Pines Rd., Stafford Springs, Conn. 06076

[21] Appl. No.: 129,026

[22] Filed: Mar. 10, 1980

[51] Int. Cl.³ .......................... F03D 7/06; F03D 3/06
[52] U.S. Cl. ..................................... 416/17; 416/109; 416/119
[58] Field of Search .................. 416/17, 111, 109, 119, 416/197 A

[56] References Cited

U.S. PATENT DOCUMENTS

| | | | |
|---|---|---|---|
| 61,530 | 1/1867 | Fowler | 416/109 |
| 1,714,808 | 5/1929 | Oliphant | 416/17 |
| 2,107,690 | 2/1938 | Clark | 416/17 |
| 2,171,732 | 9/1939 | Michaelson et al. | 416/109 |
| 3,382,931 | 5/1968 | Pontcarral et al. | 416/116 X |
| 4,203,707 | 5/1980 | Stepp | 416/119 |

FOREIGN PATENT DOCUMENTS

| | | | |
|---|---|---|---|
| 742788 | 12/1943 | Fed. Rep. of Germany | 416/17 |
| 535286 | 4/1922 | France | 416/111 |
| 24375 | 6/1922 | France | 416/119 |
| 2291379 | 6/1976 | France | 416/17 |
| 1486338 | 9/1977 | United Kingdom | 416/17 |

Primary Examiner—Everette A. Powell, Jr.

[57] ABSTRACT

A vertical axis windmill, having a plurality of propelling blades, or vanes, supported in a vertical position by horizontal support bars extending outward from a rotatable tube concentric with a main support pipe. In operation the blades remain down-wind or at an angle to the wind, and are never flat side to the wind. A cam controlled by a wind vane operates a linkage that acts to position the blades to the proper angle. Each blade is supported on a shaft that has a crank arm attached, and a device is provided to rotate the arm past center. Spring pressure is equalized on the cam rollers to reduce the reaction of the cam on the wind vane. The blades are wind directional and act somewhat as a wind vane. As the wind load on a blade increases, the angle of the blade changes and the blade adjusts itself to maintain a regulated rotating speed for the windmill.

5 Claims, 9 Drawing Figures

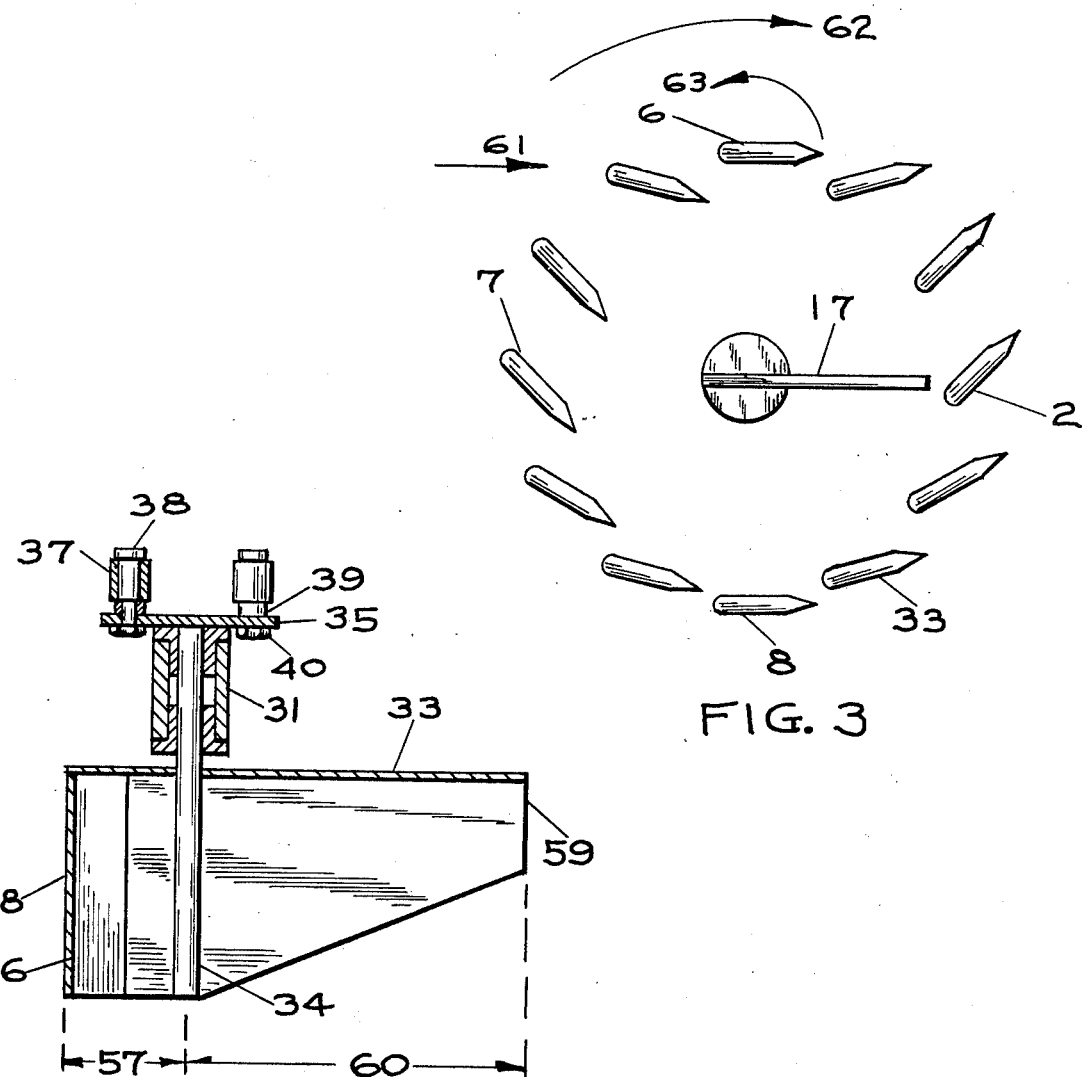
FIG. 3
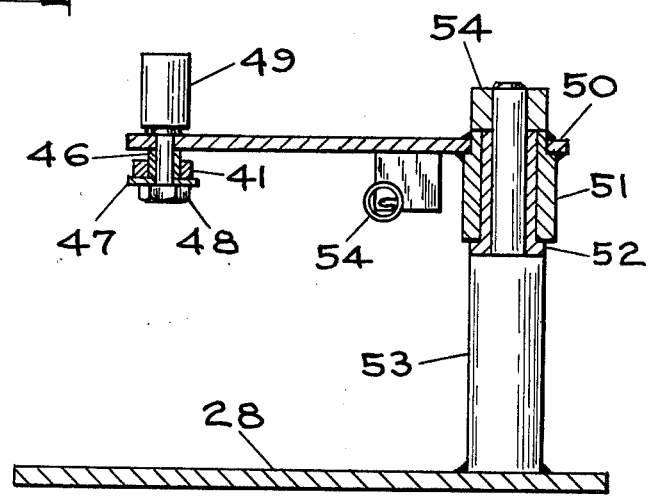
FIG. 4
FIG. 5

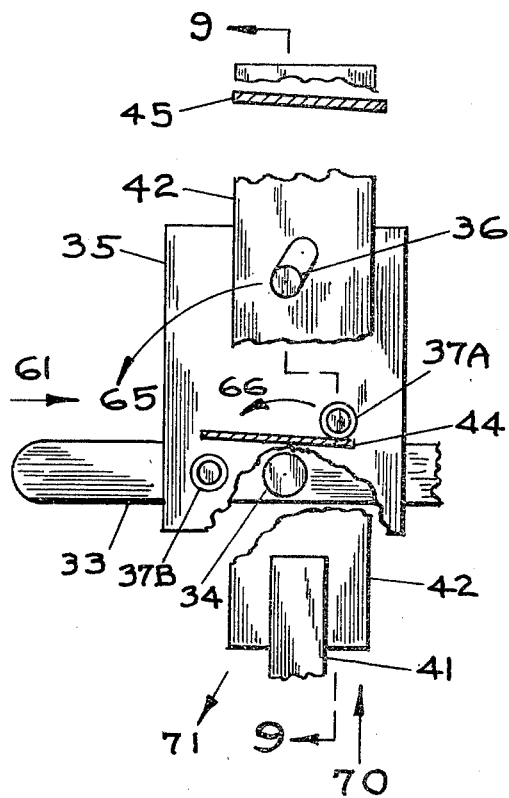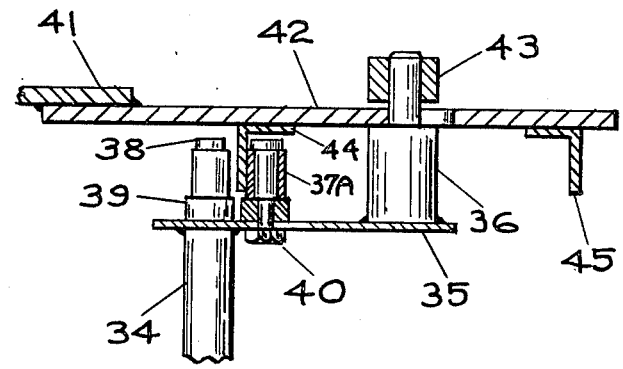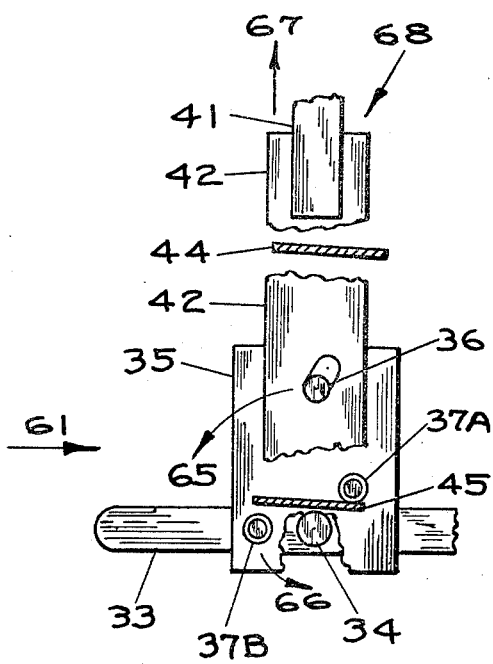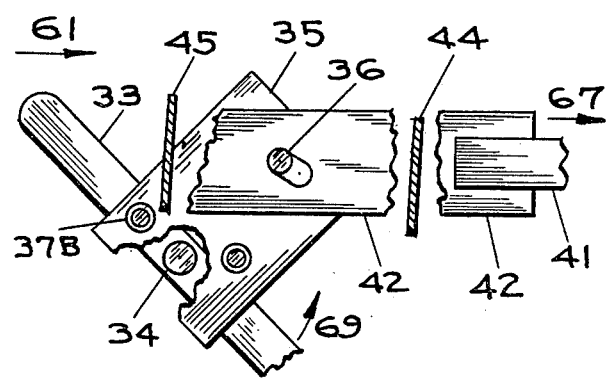
FIG. 6
FIG. 9
FIG. 8
FIG. 7

WINDMILL

BACKGROUND OF THE INVENTION

1. Field of the Invention

This invention relates to the improvement in vertical axis windmills, and more particularly, to those having mechanically controlled paddles, blades, or airfoils, and are sometimes called articulated panemones.

2. Description of the Prior Art

Many types of vertical axis windmills use chains, gears, and other devices to turn the blades to the proper angle as the windmills rotate, and most of them have the blades mechanically connected together. All of these windmills, at some point in their rotation, have some blades flat side to the wind. They are unable to react quickly to a strong gust of wind and are easily damaged. My design has each blade independent of the others, and at no time are any of them flat side to the wind. A pre-determined spring load holds the blades at a proper angle, through the action of a cam. If the wind load exceeds this balance the blades change their angle to maintain the designed rotating speed of the windmill. An excessive wind gust can feather any blade immediately in any position in its rotation and it will return to normal action when the wind speed decreases.

SUMMARY OF THE INVENTION

The present invention provides an improvement in vertical axis windmills which combine a cam with a wind vane control, to position propelling blades to the proper angle so a wind force acting on them will produce rotation of the windmill. The cam at no time will move the blades to be flat side to the wind. Cam rollers are supported on pivoting arms, and the arms have springs pulling them inward. A system is used to equalize the spring pressure on each arm. The propelling blades are specifically designed to match the spring load of the cam rollers. The blades operate somewhat like a wind vane and are wind directional. The support shaft of the propelling blades have a crank arm attached and is operated by a connecting rod driven by the cam. The end of the connecting rod attached to the crank has a device to rotate the crank arm past center. The shape of the blades and force of the springs control the speed and torque, so numerous variations are possible with windmills of the same size. These and other features and advantages of the invention will be more clearly understood from the following description and accompanying drawings.

BRIEF DESCRIPTION OF THE DRAWINGS

In the drawings:

FIG. 3 Is a diagrammatic full top plan view along line 3—3 of FIG. 1 showing the angles of the blades at various points of the windmills rotation, and the relationship of the wind vane.

FIG. 4 Is a vertical section along line 4—4 of FIG. 2 showing the relative parts of the propelling blade assembly.

FIG. 5 Is a vertical section along line 5—5 of FIG. 2 showing a cam roller, support arms and post assembly for the cam operation.

FIG. 6 Is an enlarged top plan view of the "past center device" in the location of numeral 6 of FIG. 3, illustrating the relative positions of the rollers, drive bars, and propelling blade.

FIG. 7 Is a top plan view similar to FIG. 6, but taken in the location of numeral 7 of FIG. 3.

FIG. 8 Is a top plan view similar to FIG. 6, but taken in the location of numeral 8 of FIG. 3.

FIG. 9 Is a vertical section generally indicated by the lines 9—9 of FIG. 6 showing the location of the slide plate, crank arm, rollers and drive bars.

DESCRIPTION OF THE PREFERRED EMBODIMENT

Figure 2:
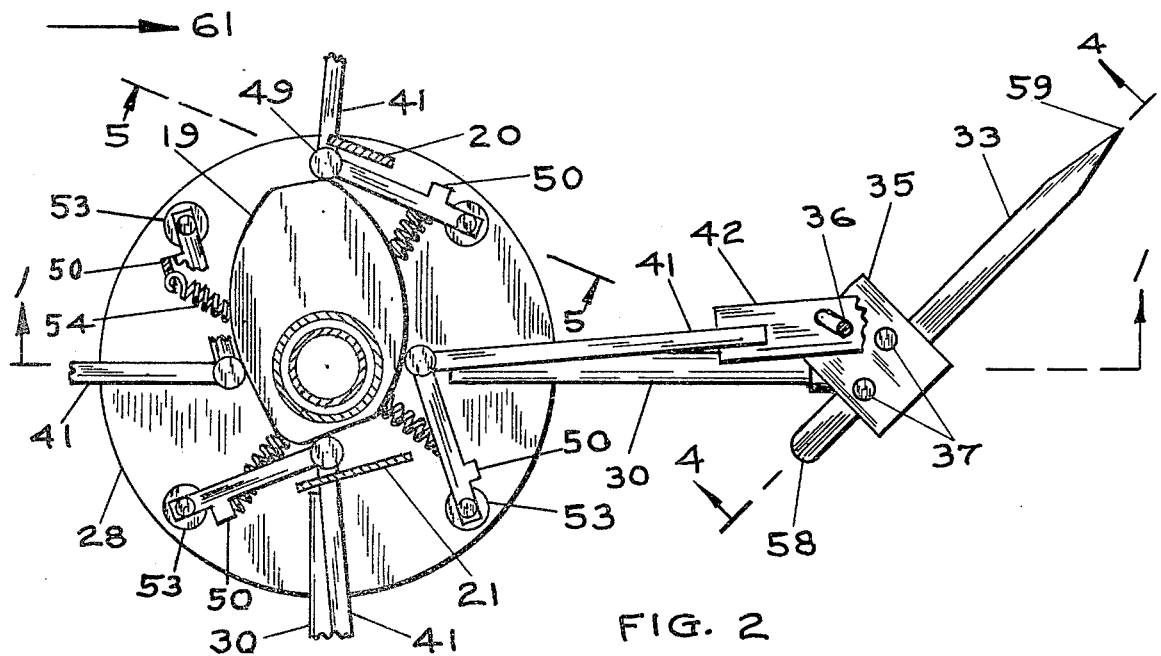
FIG. 2 Is a top, partial, plan sectional view along line 2—2 of FIG. 1 illustrating one of the propelling blades and its control linkage, the "past center device", and the relative position of the cam and rollers.
Figure 1:
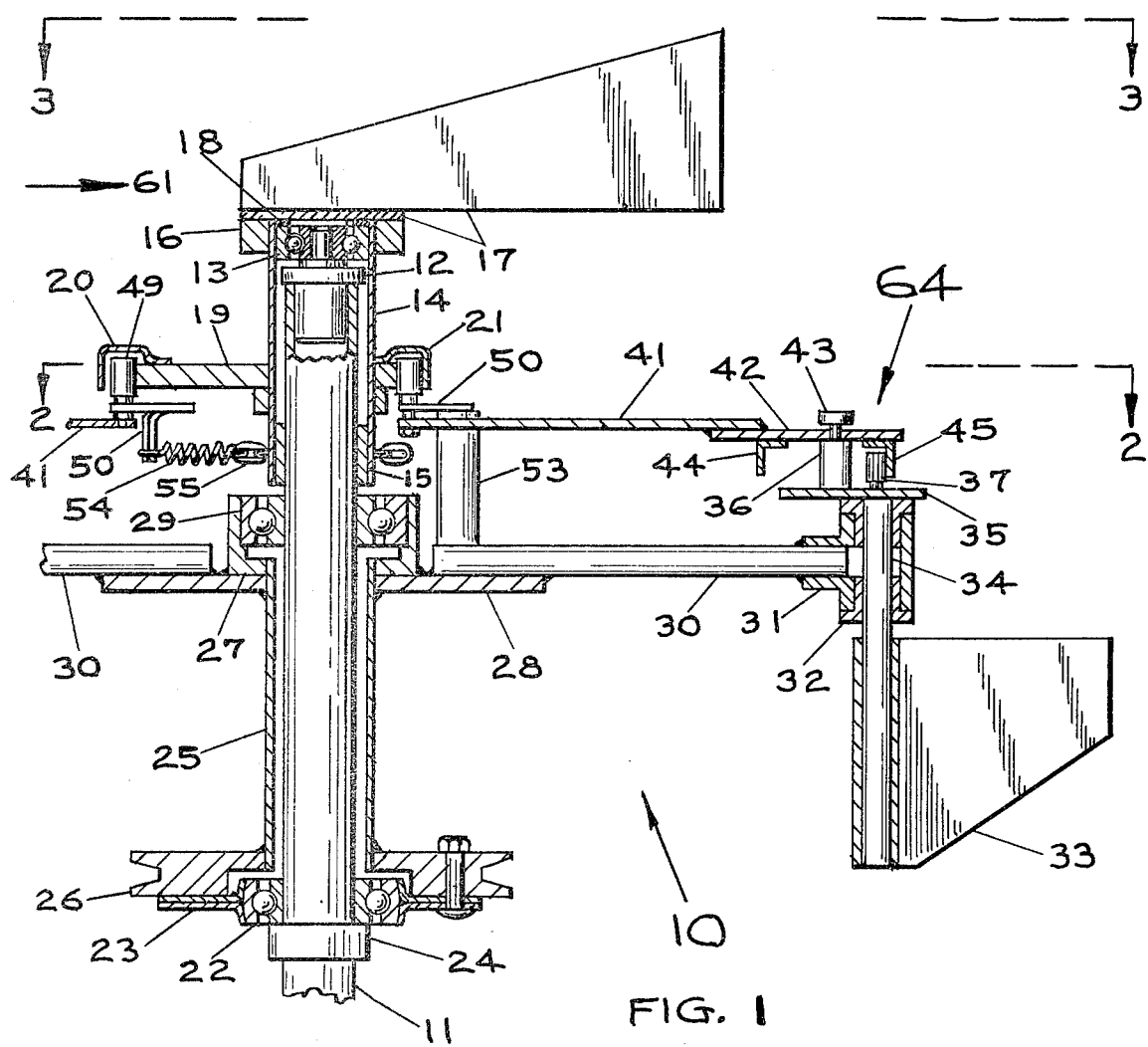
FIG. 1 Taken in the plane generally indicated by the line 1—1 of FIG. 2 is a diagrammatic, partial cross sectional view illustrating the arrangement of one propelling blade and its control linkage, a "past center device", and the cam and tube mechanisms of a windmill according to the invention.

Referring to FIG. 1 and 2 of the drawings, numeral 10 generally indicates a windmill formed according to the invention. Windmill 10 includes a vertical pipe 11 as the main support of the complete windmill. Bearing adapter 12 is attached to the top inside of pipe 11, and the inner race of bearing 13 is mounted on it. The outer race is pressed into the top inside of cam tube 14, and a bushing 15 is pressed into the bottom of cam tube 14. A set screw collar 16 is attached to cam tube 14, and wind vane 17 is fastened to collar 16. Spacer 18 is placed above bearing 13. Cam 19 is fastened to cam tube 14, in the proper timing position to wind vane 17. Short guide plate 20, and long guide plate 21 are attached to cam 19. They are shown out of position in FIG. 1, for illustration. Commercial ball bearing 22, with flanges 23, and eccentric locking collar 24, are attached to vertical pipe 11. A rotatable drive tube 25 has attached to the bottom, a plate 26, that may serve as a power take-off. The flanges 23 of bearing 22 are attached to plate 26. Hub 27 and disc 28 are attached to the top of drive tube 25. The outer race of ball bearing 29 is pressed in hub 27, with the inner race on pipe 11. A plurality of horizontal support bars 30 are attached to disc 28, these support bars, equally spaced, extend outward. Pipe tees 31 are attached to the ends of support bars 30. Flanged bushings 32 are pressed into each end of pipe tee 31. A plurality of propelling blades 33 are fastened to shafts 34, that are attached to crank arms 35. Each arm 35 has a drive stud 36 attached, and two rollers 37 fastened to it, by shoulder screws 38, spacers 39, and nuts 40. These parts are also illustrated in FIGS. 2-4 and 9. Connecting rods 41 are attached to slide plates 42, and the slot in slide plate 42 moves on stud 36. Set screw collar 43 is fastened to stud 36. Inner drive bar 44 and outer drive bar 45 are attached to slide plate 42. Shown in FIG. 5 the other end of connecting rod 41 has a hole in it operating on spacer 46, fastened in place by washer 47, and nut 48 to the shaft of a commercial cam roller 49, that is on the end of arm 50 attached to hub 51 that has bushing 52 pressed into it, and oscillates on stud 53 that is attached to disc 28. Set screw collar 54 is fastened to stud 53. A section of arm 50 is bent over and has a hole in it to connect spring 54. The other end of spring 54 is connected to a chain 55 that surrounds cam tube 14. The end of each spring is connected equally spaced around the chain 55. Shown in FIG. 4 are the functional parts of the propelling blade 33. Where the wind first strikes the propelling blade is called the leading edge 58.

Where the wind last touches the propelling blade, is called the trailing edge 59. The space between shaft 34 and the leading edge 58 is called the leading surface 57, and the space between shaft 34 and the trailing edge 59, is called the trailing surface 60. A counterweight 56, made of wood or other material, is fastened at the front end of the leading surface 57. The relationship between the pulling force of springes 54 and the design of propelling blade 33 determine the maximum rotating speed and torque of the windmill. The leading surface 57 is short in length and long in height, while the trailing surface 60 is several times longer and the height is shorter than surface 57. The surface 60 may be rectangular, but the bottom of the blade in this design is at an angle for more strength. The force of the wind blowing on these two surfaces is just sufficient to produce a directional effect to turn the propelling blade in line with the wind direction. The drag of the mechanism, and the pull of the springs combined with the speed and torque requirements of the windmill 10, determine the ratio of the areas of the two surfaces 57 and 60, and their shape. If the blades are designed properly, only a light spring load is required. The counterweight 56 is used to off-set the load on bushings 32, and to overcome the outward turn of the trailing edge 59 due to centrifugal force.

OPERATION

In operation, the various propelling blades, connecting rods, cam, wind vane, and "past center device", are operated in timed relation upon rotation of the windmill 10. The wind pressure acting on wind vane 17 places cam 19 in position for the proper motion through the mechanism to position the propelling blades 33 at an angle so that force of the wind acting on them will produce rotation of the windmill 10. The cam 19 holds the blades in line with the wind direction when moving against the wind, location 8, and when moving with the wind, location 6. Four propelling blades 33 are used in this design, although more may be used if desired. Four cam rollers 49, as shown in FIGS. 1–2 and 5, produce an even load on the cam 19 and reduce the reaction to the wind vane 17 to rotate with the cam. Springs 54 are attached equally spaced, to a chain 55 that surrounds the tube 14. This system is suspended and moves freely to equalize the spring load on the cam rollers 49. The propelling blades 33 are always in line with the wind direction or at an angle, and do not rotate in relation to the wind direction. With the wind blowing in the direction indicated by arrow 61, the windmill will rotate in the direction indicated by arrow 62, FIG. 3. The propelling blades 33 turn on their axis, in the direction indicated by arrow 63. With each revolution of the windmill 10 clockwise, mechanically the propelling blade 33 will rotate on its axis, counter-clockwise one revolution. When the connecting rod 41, drive stud 36, and shaft 34, are all in line, they are called on center, and are in a locked position. A mechanism I call a "past center device" 64, is used to produce a continuous rotation of the propelling blades on their axis. FIGS. 2-6-7-8-9 show views of this device.

Crank arm 35 acting through shaft 34, produces the rotation of propelling blade 33. Crank arm 35 has a drive stud 36 on a long radius, indicated by arrow 65, and two rollers 37 on a short radius indicated by arrow 66, with shaft 34 as the center of rotation. The long radius 65 is used when propelling blade 33 is under load, shown in location 7-2 FIG. 3. The short radii 66 are used under light load conditions, shown in location 6-8 FIG. 3. Slide plate 42 shown in FIG. 8, location 8, FIG. 3, is drawn in toward the center of the windmill, the direction indicated by arrow 67. The slot in slide plate 42, acting on stud 36, rotates crank arm 35 to a certain point, where outer drive bar 45 contacts roller 37A and rotates crank arm 35 to the position shown. Stud 36 while moving in pushes slide plate 42 sideways, and moved outer drive bar 45 behind roller 37B that is very close to the end of drive bar 45 in its rotation. The push stroke, indicated by the direction of arrow 68, through the slot at an angle of 30 degrees, (more or less), moves drive bar 45 further along roller 37B and continues to rotate crank arm 35 in the direction indicated by arrow 65. At a certain point, outer drive bar 45 slides from behind roller 37B and the drive is taken over by the slot in slide plate 42, acting on stud 36 to rotate at the long radius 65. Shown in FIG. 7, stud 36 is in a positioned maintained by the cam, spring load, the linkage, and through the slot in slide plate 42. The wind force acting on propelling blade 33 produces a rotative force in the direction indicated by arrow 69, and stud 36 is held at the end of the slot in slide plate 42. Propelling blade 33 is at an angle of 45 degrees, (more or less), in relation to the wind direction. A strong wind force will move the blade 33 in line with the wind direction. The cam roller 49 pulls away from the cam 19 and as the wind force decreases, the spring assembly draws the cam roller 49 back to the cam 19, returning propelling blade 33 to its original position. At this point, the bars 44–45 and rollers 37 are out of position and not in use.

The parts shown in FIG. 6 (location 6 FIG. 3), are similar in action to FIG. 8. Slide plate 42 is pushed away from the center of the windmill, in direction of arrow 70. The slot in slide plate 42, acting on stud 36, rotates crank arm 35 to the position shown. The pull stroke in direction indicated by arrow 71, moves inner drive bar 44, to contact roller 37B and rotates crank arm 35 in the direction indicated by arrow 65, and at a certain point the drive is taken over by the slot in slide plate 42, acting on stud 36. The "past center device" 64, location 2 FIG. 3, and shown in FIG. 2, is similar in action to FIG. 7, but with the trailing edge 59 of propelling blade 33 on the other side of center. The "past center device" 64 will not operate properly unless the cam roller 49 returns to the full "in" position on the cam, location 8 FIG. 3, and shown in FIG. 2. Long guide plate 21 is used to pull the roller 49 all the way in. A similar short guide plate 20 is used to assist the cam roller 49 to move around the corner of the cam 19.

The description and drawings in this disclosure show a windmill turning in a clockwise direction, but it can be made to turn counter-clockwise by reversing the cam 19 and the location of the rollers 37 on the crank arm 35. I do not desire to be limited to the exact details of construction shown and described, for obvious modifications will occur to a person skilled in the art.

I claim:

1. A vertical axis windmill, comprising a vertical support pipe, a drive tube rotatably mounted on said support pipe, a disc attached to the top of said drive tube, a plurality of horizontal support bars extending outward attached to said disc, a rotatably mounted vertical shaft at the end of each said support bar, a crank arm attached to the top of said vertical shaft and a propelling blade fastened to the lower part of said vertical shaft, a cam tube rotatably mounted on said support pipe above the said drive tube, means for mounting a cam on said cam tube, a wind vane fixed to said cam tube for rotating said cam tube in response to a change in the direction of the wind, means for supporting a plurality of oscillating arms, a cam roller mounted on the end of each said oscillating arm, said cam rollers bearing against said cam by a spring means, means for mounting a connecting rod to each cam roller shaft, a slide plate attached to the other end of said connecting rod, a "past center device" connecting said slide plate to said crank arm, to translate the reciprocating motion of the said connecting rod, to rotary motion of said crank arm, said vertical shaft and said propelling blades that rotate on their axis in the opposite direction to the rotation of the windmill, the assembly of these parts and the motion of the linkage, through the said "past center device", deriving from the contour of said cam act to position said propelling blades to the proper angle to produce rotation of the windmill and the proportions and shape of said propelling blades are such as to produce a driving force and a small amount of wind directional effect that together with the designed load of said spring means act to provide a maximum speed control of the rotation of the windmill, therefore if a wind force on said propelling blades exceeds the said load of said spring means the angle of said propelling blade changes thus reducing the said driving force and maintaining the designed rotating speed and as each said propelling blade is independent of the others, a strong wind gust can feather any blade immediately to avoid damage, and as the wind force abates the said propelling blade resumes its normal position as all said propelling blades are in continuous control by the mechanism through the full rotation of the windmill.

2. A windmill according to claim 1, and further comprising a said spring means wherein a plurality of said oscillating arms each have a spring connected and the other end of each said spring is connected, equally spaced, to a chain formed in a continuous circle, said spring means being suspended, having free movement and said chain not touching said cam tube in its movement, said spring means through linkage means holding the said cam rollers to said cam and maintaining the proper angle of said propelling blades, and producing an equalizing load to the said propelling blades from the low side to the high side of the said contour of said cam, the said spring means in combination with the design of said propelling blades determine the rotating speed of the windmill.

3. A windmill according to claim 1, and further comprising said cam the contour of which is to produce the following actions through said cam rollers means, said connecting rod means, said "past center device" means and said crank arm means, to cause said propelling blades to perform an operating cycle including the steps of: A- an assumed wind direction being from the south, a plan view of said windmill having a clockwise rotation, starting with a said propelling blade at an easterly location, the length of said propelling blade being in line with the said wind direction, the leading edge of said propelling blade facing south, this attitude being maintained to a south easterly location, B- the angle of said propelling blade gradually changing to 45 degrees, more or less, said leading edge of said propelling blade facing south westerly, said angle being maintained to a south westerly location, C- said angle of said propelling blade gradually changing to zero, the length of said propelling blade being in line with said wind direction, with said leading edge facing south, this attitude being maintained to a north-westerly location, D- the angle of said propelling blade gradually changing to 45 degrees, more or less, said leading edge of said propelling blade, facing a south-easterly direction, this attitude being maintained to a north-easterly location, E- said angle of said blade gradually changing to zero, said leading edge of said blade facing south, this attitude being maintained to an easterly location, the starting point of the action.

4. A windmill according to claim 1, and further comprising said "past center device", to translate the said reciprocating motion of said connecting rod to the rotary motion of said crank arm, means for attaching a said vertical shaft to said crank arm, said vertical shaft being the center of rotation of said crank arm, a drive stud attached to said crank arm at a long radius from said center of rotation, means for supporting a roller B, 90 degrees, more or less, to the right of said drive stud, and roller A, 45 degrees, more or less, left of said drive stud, both rollers being on a shorter radius from said center of rotation than said drive stud, means for attaching said connecting rod to said slide plate, an inner drive bar attached to said slide plate, adjacent to said connecting rod, an outer drive bar attached at the end of said slide plate, midway between said inner drive bar and said outer drive bar is a slot in said slide plate, said slot having a sliding position on said drive stud, rotation of said crank arm, in a counter-clockwise direction is explained in the steps of A: said connecting rod being drawn in, (FIG. 8) the center of said windmill, said drive stud, and said vertical shaft are all in line, said outer drive bar is between said rollers, when said connecting rod is moved outward, said outer drive bar contacts roller B, and rotation of said crank arm starts, and continues to a point (FIG. 7) where said outer drive bar moves from behind said roller B and said slot drives said drive stud, and the force for rotation of said crank arm is on the said long radius, at a certain point said inner drive bar contacts roller A (FIG. 6) and the drive rotation is reduced to the said shorter radius, to a point where said connecting rod is in the full out position, B: the center of said windmill, said drive stud, and said vertical shaft are all in line, said inner drive bar is between said rollers, and contacts said roller B when said connecting rod is pulled inward and rotation of said crank arm continues to a point (FIG. 2) where said inner drive bar moves from behind said roller B, and said slot drives said drive stud, the force for rotation of said crank arm is on the said long radius, at a certain point, said outer drive bar contacts roller B, and rotates said crank arm to the location of starting point.

5. A windmill according to claim 1, and further comprising the design and structure of said propelling blade, using the height of the trailing edge (59) as the basic dimension, the dimensions of the rest of said propelling blade are in the following proportions, the leading surface is rectangular in shape and the length (57) is the same as the said basic dimension, the height of the leading edge (58) is two times the said basic dimension, the length of the trailing surface (60) is three and one half times the said basic dimension, the bottom of said trailing surface is at an angle formed by a line moving from the bottom of said trailing edge to the intersection of the center line of said vertical shaft, bottom of said leading surface, means for attaching said vertical shaft and attaching a counter weight adjacent to said leading edge to reduce the effect of centrifugal force to drive the said trailing edge outward.

* * * * *